(12) United States Patent
Hwang et al.

(10) Patent No.: US 10,472,586 B2
(45) Date of Patent: Nov. 12, 2019

(54) LUBRICATING COATING COMPOSITION AND COMPRESSOR INCLUDING THE SAME

(71) Applicant: Hanon Systems, Daejeon (KR)

(72) Inventors: Seung Yong Hwang, Daejeon (KR); Joon Hee Moon, Daejeon (KR); Eun Gi Son, Daejeon (KR); Jae Wook Joo, Daejeon (KR); Jae Hyun Hur, Daejeon (KR); Kye Young Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 3 days.

(21) Appl. No.: 15/919,304

(22) Filed: Mar. 13, 2018

(65) Prior Publication Data

US 2018/0201869 A1 Jul. 19, 2018

Related U.S. Application Data

(62) Division of application No. 14/753,070, filed on Jun. 29, 2015, now Pat. No. 9,944,884.

(30) Foreign Application Priority Data

Aug. 29, 2014 (KR) ........................ 10-2014-0113900

(51) Int. Cl.
| | | |
|---|---|---|
| *C10M 169/04* | (2006.01) | |
| *C09D 179/08* | (2006.01) | |
| *B05D 3/00* | (2006.01) | |
| *B05D 3/02* | (2006.01) | |
| *B05D 5/08* | (2006.01) | |
| *F04B 39/02* | (2006.01) | |

(52) U.S. Cl.
CPC ......... *C10M 169/044* (2013.01); *B05D 3/007* (2013.01); *B05D 3/0254* (2013.01); *B05D 5/083* (2013.01); *C09D 179/08* (2013.01); *F04B 39/0215* (2013.01); *C10M 2201/041* (2013.01); *C10M 2201/061* (2013.01); *C10M 2201/062* (2013.01); *C10M 2201/066* (2013.01); *C10M 2213/062* (2013.01); *C10M 2217/0443* (2013.01); *C10M 2227/04* (2013.01); *C10N 2230/06* (2013.01); *C10N 2240/30* (2013.01); *C10N 2250/121* (2013.01); *F05C 2203/0869* (2013.01); *F05C 2203/0882* (2013.01); *F05C 2225/04* (2013.01); *F05C 2251/14* (2013.01)

(58) Field of Classification Search
CPC ........ C10M 169/044; C10M 2201/041; C10M 2201/062; C10M 2201/066; C10M 2213/062; C10M 2217/0443; C10M 2227/04; C10M 2201/061; C09D 179/08; B05D 3/007; B05D 3/0254; B05D 5/083; F04B 39/0215; C10N 2240/30; C10N 2250/121; C10N 2230/06; F05C 2203/0869; F05C 2203/0882; F05C 2225/04
See application file for complete search history.

(56) References Cited

U.S. PATENT DOCUMENTS

| | | | |
|---|---|---|---|
| 4,139,576 A | 2/1979 | Yoshimura et al. | |
| 2004/0224856 A1 | 11/2004 | Saiki et al. | |
| 2005/0135954 A1* | 6/2005 | Saiki .................. | F04B 27/1036 417/572 |
| 2012/0101011 A1* | 4/2012 | Makino ................ | C10M 125/00 508/100 |
| 2013/0174724 A1* | 7/2013 | Tanigawa ............. | C10M 169/04 92/57 |

FOREIGN PATENT DOCUMENTS

| | | |
|---|---|---|
| CN | 101463288 B | 3/2012 |
| CN | 102459544 A | 5/2012 |
| JP | 2005170960 A | 6/2005 |
| JP | 2009209727 A | 9/2009 |
| KR | 101086847 B1 | 11/2011 |

* cited by examiner

*Primary Examiner* — Cephia D Toomer
(74) *Attorney, Agent, or Firm* — Shumaker, Loop & Kendrick, LLP; James D. Miller

(57) ABSTRACT

A lubricating coating composition and a compressor including a sliding member coated with the lubricating coating composition. The lubricating coating composition includes a thermosetting or thermoplastic polyimide-based resin as a binder, a solid lubricant, various solvents, and other additives at a controlled ratio. The compressor includes a first member including a first sliding surface and a second member moving relative to the first member including a second sliding surface. The lubricating coating composition is applied to the first sliding surface or the second sliding surface.

5 Claims, No Drawings

LUBRICATING COATING COMPOSITION AND COMPRESSOR INCLUDING THE SAME

CROSS-REFERENCE(S) TO RELATED APPLICATIONS

This patent application is a divisional patent application of U.S. patent application Ser. No. 14/753,070 filed on Jun. 29, 2015 which claims priority to Korean Patent Application No. 10-2014-0113900 filed on Aug. 29, 2014, the entire disclosures of which are incorporated herein by reference.

FIELD OF THE INVENTION

Exemplary embodiments of the present invention relate to a lubricating coating composition and a compressor coated with a lubricating film formed of the lubricating coating composition, and more particularly, to a coating composition for surface treatment, which is used to improve the abrasion resistance, seizure resistance, heat resistance or lubricating properties of an iron-based or aluminum-based sliding member, and to a compressor in which the composition is coated on any one of members, which slide against each other, to increase the sliding ability and reliability of the sliding members.

BACKGROUND OF THE INVENTION

A swash plate-type compressor that is frequently used as a compressor for an automotive air conditioning system comprises a swash plate secured to a rotary shaft at an inclined angle, and a plurality of shoes disposed at the front and rear sides of the swash plate and operably coupled to a piston. When the rotary shaft rotates, the disc-shaped swash plate secured to the rotary shaft rotates, and the rotary motion of the swash plate mediated by the shoes is converted to the reciprocating motion of the piston to compress, expand, and discharge a refrigerant. In the case of this swash plate-type compressor, if the metal swash plate slides relative to the shoes in an initial operating state before lubricating oil reaches the inside of a housing including a refrigerant, the sliding portion will be free of lubricating oil, thus causing a seizure phenomenon.

Japanese Unexamined Patent Application Publication No. 2009-209727 and Korean Patent No. 10-1086847 disclose a mixture of a solid lubricant such as PTFE, $MoS_2$, $WS_2$ or crystalline graphite, a metal oxide or silane coupling agent for increasing abrasion resistance or adhesion to a substrate, and a binder such as polyamide imide resin, is dispersed in various solvents to prepare slurry-state lubricating compositions, and the lubricating compositions are applied to the front and sides of a swash plate made of an iron- or aluminum-based material to form lubricating layers. The lubricating properties of such lubricating compositions comprising a binder resin, a solid lubricant, additives and a solvent significantly differ depending on the surface state of a swash plate, the physical properties of the lubricating composition, and conditions in which the lubricating composition is coated on the surfaces of the swash plate. Japanese Unexamined Patent Application Publication No. 2009-209727 discloses that both surfaces of a disc-shaped steel plate are polished, and a low-friction resin coating layer comprising 40-50 wt % of fluorine resin (PTFE, etc.), 1-10 wt % of graphite and 45-55 wt % of matrix resin is formed on a sliding surface of the polished steel plate, which slides against shoes. Korean Patent No. 10-1086847 discloses a lubricating member comprising 30-70 wt % of a binder, 25-60 wt % of a solid lubricant and 5-10 wt % of other additives. However, the patent document discloses only the ratio of components in the lubricating member, does not mention a liquid slurry composition for the lubricating member composition, and thus does not disclose the contents of solids (binder, solid lubricant, other additives, etc.) in a lubricating member slurry for coating on a sliding member, the kind of solvent, and the viscosity of a liquid lubricating coating composition. However, in an actual operation of coating the lubricating member on the surface of a swash plate, the ratio of the solid lubricant in the composition, the kind of solvent, and the changes in solid content and viscosity by the addition of the solvent, will influence the various physical and chemical properties of the lubricating member, including abrasion resistance, adhesion to a substrate, heat resistance, durability, seizure resistance and lubricating properties. In fact, if the amount of a solvent in a lubricating composition is too large, it will be difficult to form a uniform and thin coating layer even by any coating process, and if the viscosity of a lubricating composition is too low, it will be difficult to form a coating layer having a desired thickness, because the adhesion of the composition to a substrate is low.

SUMMARY OF THE INVENTION

The present invention relates to a lubricating coating composition and a compressor comprising the same. Specifically, an object of the present invention is to provide an excellent lubricating coating composition which comprises a thermosetting or thermoplastic polyimide-based resin as a binder, a solid lubricant, various solvents and other filler at a controlled ratio so as to improve the abrasion resistance, seizure resistance, lubricating ability, heat resistance, adhesion to a substrate, and flexibility of the composition, and thus does not cause seizure even when $CO_2$ gas is used as a refrigerant, and a compressor coated with the lubricating coating composition.

In the following description, numerous specific details are set forth, such as specific configurations, compositions, and processes, etc., in order to provide a thorough understanding of the present invention. However, certain embodiments may be practiced without one or more of these specific details, or in combination with other known methods and configurations. In other instances, well-known processes and manufacturing techniques have not been described in particular detail in order to not unnecessarily obscure the present invention. Reference throughout this specification to "one embodiment" or "an embodiment" means that a particular feature, configuration, composition, or characteristic described in connection with the embodiment is included in at least one embodiment of the present invention. Thus, the appearances of the phrase "in one embodiment" or "an embodiment" in various places throughout this specification are not necessarily referring to the same embodiment of the invention. Furthermore, the particular features, configurations, compositions, or characteristics may be combined in any suitable manner in one or more embodiments.

In an embodiment, the present invention relates to a lubricating coating composition comprising a polyimide-based resin, a solid lubricant, a filler, a silane coupling agent and a solvent.

The lubricating coating composition according to the present invention comprises, based on the total weight of the composition, 10-24 wt % of the polyimide-based resin, 6-10 wt % of the solid lubricant, 1-2.5 wt % of the filler, 0.1-2.4 wt % of the silane coupling agent, and 70-80 wt % of the solvent.

The lubricating coating composition may comprise the polyimide-based resin and the solid lubricant at a weight ratio of 1.6:1 to 3:1. The polyimide-based resin acts as a binder, and may be polyamide imide that is a thermosetting resin, and the solid lubricant may be selected from the group consisting of, for example, polytetrafluoroethylene (PTFE), crystalline molybdenum disulfide ($MoS_2$), tungsten disulfide ($WS_2$), hexagonal boron nitride (h-BN), and expanded graphite. Preferably, polytetrafluoroethylene (PTFE) is used as the lubricant.

In an embodiment, the filler may be fine powder such as silicon carbide (SiC), alumina ($Al_2O_3$), zirconium oxide ($ZrO_2$), titanium oxide ($TiO_2$), carbon black (C) or the like, and the silane coupling agent is used to increase the adhesion of the solid lubricant or the filler to a substrate.

The solid lubricant may be fine powder. As the solid lubricant, polytetrafluoroethylene (PTFE) may have an average particle diameter of 0.1-1 µm, and crystalline molybdenum disulfide ($MoS_2$), tungsten disulfide ($WS_2$), hexagonal boron nitride (h-BN) and expanded graphite may have an average particle diameter of 2 µm or less.

The filler may be two or more selected from the group consisting of silicon carbide (SiC), alumina ($Al_2O_3$), zirconium oxide ($ZrO_2$), titanium oxide ($TiO_2$) and carbon black (C), and may be fine powder having an average particle diameter of 2 µm or less.

The silane coupling agent may be selected from the group consisting of aminophenyltrimethoxysilane ($C_9H_{15}NO_3Si$), N-(2-aminoethyl)-3-aminopropyl trimethoxysilane ($C_8H_{22}N_2O_3Si$), bis(triethoxypropyl)amine ($C_{18}H_{43}NO_6Si_2$), (chloromethyl)phenylethyl trimethoxysilane ($C_{12}H_{19}ClO_3Si$), and Pt(0)-1,3-divinyl-1,1,3,3-tetramethyldisiloxane.

In an embodiment, a mixture of various solvents may be used to prepare a composition for coating the lubricating member on a compressor swash plate. The solvent that is used in the present invention may comprise four or more compounds selected from the group consisting of N-methyl-2-pyrrolidone (NMP), xylene, methoxypropyl acetate, dimethylacetamide (DMAC), butanone, and methyl ethyl ketone (MEK). Favorable results have been found using a solvent comprising N-methyl-2-pyrrolidone (NMP), xylene, dimethylacetamide (DMAC) and methyl ethyl ketone (MEK) may be used to control the solid content and viscosity of the lubricating coating composition.

The solvent may comprise N-methyl-2-pyrrolidone (NMP) and dimethylacetamide (DMAC) at a weight ratio of 2.5:1 to 4:1.

The lubricating coating composition may comprise, based on the total weight of the composition, 20-40 wt % of solids and 60-80 wt % of the solvent. In some embodiments, the lubricating coating composition may comprise 22-24 wt % of solids and 76-78 wt % of the solvent, and may have a viscosity of 30-40 cP.

In another embodiment, the present invention relates to a method for preparing a lubricating coating composition, comprising the steps of: i) mixing a polyimide-based resin with a solvent to prepare a first mixture; ii) mixing the first mixture with a solid lubricant to prepare a second mixture; and iii) mixing the second mixture with a silane coupling agent and a filler.

The polyimide-based resin may be polyamide imide; the solid lubricant may be polytetrafluoroethylene (PTFE); the solvent may comprise N-methyl-2-pyrrolidone (NMP), xylene, dimethylacetamide (DMAC) and methyl ethyl ketone (MEK); and the filler may be two or more selected from the group consisting of silicon carbide (SiC), alumina ($Al_2O_3$), zirconium oxide ($ZrO_2$), titanium oxide ($TiO_2$) and carbon black (C), and may be fine powder having an average particle diameter of 2 µm or less.

In another embodiment, the present invention relates to a compressor comprising a first sliding surface of a first member, and a second sliding surface of a second member, which move relative to each other, and the lubricating coating composition or a lubricating coating composition prepared by the method for preparing the lubricating coating composition is coated on any one of the first sliding surface and the second sliding surface to form a lubricating layer. The lubricating layer may have a thickness of 8-25 µm. In addition, the lubricating layer may be formed by a method comprising the steps of: applying the lubricating coating composition; drying the applied composition at a temperature of 80 to 120° C. for 1 hour or more; calcining the dried composition at a temperature of 200 to 300° C. for 40-120 minutes; and cooling the calcined composition at a temperature between of 20° C. and 30° C. for 3 hours or more. The composition to be coated is fed into a spray process, and the particles of the composition are guided through a feed line, and come out through an inlet so as to be picked up by a carrier gas stream. For coating purposes, the carrier gas stream is directed to a part to be coated. Energy is transferred depending on a coating process and materials so that the particles are attached to the part to be coated. For example, energy is generated by heating the particles during spraying, or kinetic energy resulting from the acceleration of the particles by collision with the part to be coated is changed or converted to heat, thereby coating the part. A dipping process relates to the surface treatment of the part and refers to a process in which the part can be coated to a certain thickness. Specifically, it refers to a process in which the surface of the part is simply rotated and is cured in a drying furnace.

DETAILED DESCRIPTION OF EXEMPLARY EMBODIMENTS OF THE INVENTION

Hereinafter, the present invention will be described in further detail with reference to examples. It will be obvious to those skilled in the art that these examples are for illustrative purposes only and are not intended to limit the scope of the present invention.

EXAMPLE 1

Preparation Of Lubricating Coating Composition

PREPARATION EXAMPLE 1

A lubricating coating composition comprising, based on the total weight of the composition, 16 wt % of PAI, 10 wt % of PTFE, 0.5 wt % of a silane coupling agent, 1.5 wt % of carbon black, 1.0 wt % of alumina ($Al_2O_3$) and 71 wt % of a solvent, was prepared. The solvent comprises, based on the total weight of the composition, 27 wt % of NMP, 9 wt % of xylene, 20 wt % of MEK and 15 wt % of DMAC. The lubricating coating composition was coated on a surface of a swash plate having a high surface roughness to a thickness of 8-25 µm, after which it was dried at 80° C. to 120☐ for 1 hour or more, and then calcined at 200° C. to 300° C. for 40-120 minutes, and the calcined substrate was cooled at a temperature between 20° C. and 30° C. for 3 hours or more.

PREPARATION EXAMPLE 2

A lubricating coating composition was prepared in the same manner as described in Preparation Example 1, except that the composition comprises, based on the total weight of the composition, 19 wt % of PAI, 7 wt % of PTFE, 1 wt % of carbon black, 1.5 wt % of alumina ($Al_2O_3$) and 66 wt % of a solvent, and the solvent comprises 10 wt % of DMAC.

PREPARATION EXAMPLE 3

A lubricating coating composition was prepared in the same manner as described in Preparation Example 1, except that the composition comprises, based on the total weight of the composition, 6 wt % of PTFE, 0.5 wt % of carbon black and 81 wt % of a solvent, and the solvent comprises 37 wt % of NMP and 10 wt % of DMAC.

PREPARATION EXAMPLE 4

A lubricating coating composition was prepared in the same manner as described in Preparation Example 1, except that the composition comprises, based on the total weight of the composition, 8 wt % of PTFE, 0.5 wt % of carbon black, 0.5 wt % of alumina ($Al_2O_3$) and 81.5 wt % of a solvent, and the solvent comprises 37.5 wt % of NMP and 10 wt % of DMAC.

COMPARATIVE EXAMPLE 1

A lubricating coating composition was prepared in the same manner as described in Preparation Example 1, except that the composition comprises, based on the total weight of the composition, 25 wt % of PAI, 15 wt % of PTFE, 2.5 wt % of a silane coupling agent, 2.5 wt % of carbon black, 2.0 wt % of alumina ($Al_2O_3$) and 53 wt % of a solvent, and the solvent comprises 24 wt % of NMP, 5 wt % of xylene, 17 wt % of MEK and 7 wt % of DMAC.

COMPARATIVE EXAMPLE 2

A lubricating coating composition was prepared in the same manner as described in Preparation Example 1, except that the composition comprises, based on the total weight of the composition, 30 wt % of PAI, 13 wt % of PTFE, 2.5 wt % of a silane coupling agent, 2.5 wt % of carbon black, 2.0 wt % of alumina ($Al_2O_3$) and 50 wt % of a solvent, and the solvent comprises 20 wt % of NMP, 7 wt % of xylene, 15 wt % of MEK and 8 wt % of DMAC.

COMPARATIVE EXAMPLE 3

A lubricating coating composition was prepared in the same manner as described in Preparation Example 1, except that the composition comprises, based on the total weight of the composition, 35 wt % of PAI, 10 wt % of PTFE, 2.5 wt % of a silane coupling agent, 2.5 wt % of carbon black, 2.0 wt % of alumina ($Al_2O_3$) and 48 wt % of a solvent, and the solvent comprises 18 wt % of NMP, 8 wt % of xylene, 12 wt % of MEK and 10 wt % of DMAC.

EXAMPLE 2

Comparison Of Properties Of Lubricating Coating Compositions

The properties of the lubricating coating compositions, prepared in Preparation Examples 1 to 4 and Comparative Examples 1 to 3, and compressors comprising the lubricating coating compositions, were compared.

TABLE 1

| | (solid content: 20-30 wt %; viscosity: 30-40 cP at 25° C.) | | | | | | | | | | |
|---|---|---|---|---|---|---|---|---|---|---|---|
| | Binder | Solid lubricant + other additives | | | | Solvent | | | | Friction | ML | RL |
| | PAI | PTFE | Pt-sil | C | $Al_2O_3$ | NMP | Xylene | MEK | DMAC | coefficient | (min) | (kgf) |
| Preparation Example 1 | 16 | 10 | 0.5 | 1.5 | 1.0 | 27 | 9 | 20 | 15 | 0.05 | 10 | 1,300 |
| Preparation Example 2 | 19 | 7 | 0.5 | 1 | 1.5 | 27 | 9 | 20 | 10 | 0.03 | 11 | 1,800 |
| Preparation Example 3 | 16 | 6 | 0.5 | 0.5 | 1.0 | 37 | 9 | 20 | 10 | 0.03 | 15 | 1,800 |
| Preparation Example 4 | 16 | 8 | 0.5 | 0.5 | 0.5 | 37.5 | 9 | 20 | 10 | 0.03 | 12 | 1,850 |
| Comparative Example 1 | 25 | 15 | 2.5 | 2.5 | 2.0 | 24 | 5 | 17 | 7 | 0.02 | 6 | 1,300 |
| Comparative Example 2 | 30 | 13 | 2.5 | 2.5 | 2.0 | 20 | 7 | 15 | 8 | 0.02 | 6 | 1,200 |
| Comparative Example 3 | 35 | 10 | 2.5 | 2.5 | 2.0 | 18 | 8 | 12 | 10 | 0.02 | 3 | 1,250 |

An ML test is an abrasion durability test in which the swash plate is optionally operated from a normal state in which lubricating oil is fed to the swash plate to an abnormal state in which lubricating oil is absent, and the extent to which the swash plate resists this state is measured. In the ML test, when the swash plate is operated for 7 minutes or more under the conditions of stage 6 (2,300 rpm, 200 kgf load, and lubrication-free state) of a seizure test ML standard table of Table 2 below, which are the worst expected conditions that can occur during the use of the swash plate, the swash plate is determined to satisfy the standard.

An RL test is a load test in which an abnormal load expected to be caused by an external impact or other factors in a normal operating state is applied to a test sample, and the maximum load that the test sample can resist is measured. In the seizure test RL standard table of Table 3 below, stages 1 to 3 correspond to a normal operating state, and stage 4 is a test in which a load is increased gradually from 45 kgf while a normal operating state (1000 rpm, feeding of lubricating oil) is maintained. When the test sample resists a load of 1,300 kgf or more, it is determined to satisfy the standard.

TABLE 2

| | Test conditions in each step | | | | |
|---|---|---|---|---|---|
| Stage | rpm | Load (kgf) | Time (sec) | Feeding of lubricating oil | Cumulative time (sec) |
| 1 | 100 | 45 | 30 | | 30 |
| 2 | 1,300 | 45 | 60 | | 60 |
| 3 | 1,300 | 200 | 90 | | 150 |
| 4 | 1,300 | 200 | 480 | | 630 |
| 5 | 2,300 | 200 | 150 | | 780 |
| 6 | 2,300 | 200 | 1,200 | X | |

TABLE 3

| | Test conditions in each step | | | |
|---|---|---|---|---|
| Stage | rpm | Loading (kgf) | Time (sec) | Feeding of lubricating oil |
| 1 | 100 | 45 | 30 | |
| 2 | 1,000 | 45 | 60 | |
| 3 | 1,000 | 45 | 480 | |
| 4 | 1,000 | 1850 | 1,200 | |

As can be seen in Table 1, the conditions of the Preparation Examples 1 to 4 passed both the ML and RL test standards. In other words, it can be seen that the liquid lubricating coating composition having a solid content of 20-26 wt % and a viscosity of 30-40 cP satisfied all the test standards. However, it can be seen that, when the solid content and the viscosity were out of the above ranges, the composition did not satisfy the test standards. Thus, it can be seen that, when the contents of a binder, a solid lubricant, other additives and a solvent in a lubricating coating composition for coating the surface of an iron or aluminum-based swash plate are controlled within a very narrow range, the composition can provide a product that satisfies the standards.

As described above, according to the present invention, changes in the solid content and viscosity of a lubricating coating composition for coating the surface of an iron or aluminum-based swash plate have a great effect on the adhesion of the composition to the surface in drying and calcining processes, and the lubricating ability of the composition.

Although the preferred embodiments of the present invention have been disclosed for illustrative purposes only, those skilled in the art will appreciate that various modifications and alterations are possible, without departing from the essential features of the present invention. Therefore, the disclosed embodiments are considered to be illustrative in all respects and not restrictive, and the scope of the technical idea of the present invention is not limited to these embodiments. The scope of protection of the present invention should be defined by the appended claims, and all equivalents that fall within the technical idea of the present invention are intended to be embraced by the scope of the claims of the present invention.

What is claimed is:

1. A compressor comprising:
a first sliding surface of a first member;
a second sliding surface of a second member, the first sliding surface and the second sliding surface move relative to each other; and
a lubricating coating composition coated on any one of the first sliding surface and the second sliding surface to form a lubricating layer, wherein the lubricating coating composition further comprises:
a polyimide-based resin;
a solid lubricant;
a filler;
a silane coupling agent; and
a solvent, wherein based on a total weight of the lubricating coating composition, 10-24 wt % of the polyimide-based resin, 6-10 wt % of the solid lubricant, 1--2.5 wt % of the filler, 0.1-2.4 wt % of the silane coupling agent, and 60-80 wt % of the solvent, wherein the polyimide-based resin is polyamide imide, wherein the solid lubricant is polytetrafluoroethylene (PTFE), wherein the filler is alumina ($Al_2O_3$), wherein the silane coupling agent is Pt(0)-1,3-divinyl-1,1,3,3-tetramethyldisiloxane, wherein the solvent is consisting of N-methyl-2-pyrrolidone (NMP), xylene, dimethylacetamide (DMAC), and methyl ethyl ketone (MEK), and wherein the lubricating coating composition has a viscosity of 30-40 cP.

2. The compressor of claim 1, wherein the polyimide-based resin and the solid lubricant are present at a weight ratio of 1.6:1 to 3:1.

3. The compressor of claim 1, wherein the polytetrafluoroethylene (PTFE) has an average particle diameter of 0.1-1 μm.

4. The compressor of claim 1, wherein the filler has an average particle diameter of more than 0 and 2 μm or less.

5. The compressor of claim 1, wherein the solvent comprises N-methyl-2-pyrrolidone (NMP) and dimethylacetamide (DMAC) at a weight ratio of 2.5:1 to 4:1.

* * * * *